US008103593B2

(12) United States Patent
Kim

(10) Patent No.: US 8,103,593 B2
(45) Date of Patent: Jan. 24, 2012

(54) METHOD AND SYSTEM FOR PROVIDING DRM LICENSE

(75) Inventor: Hyoung-shick Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 540 days.

(21) Appl. No.: 11/580,110

(22) Filed: Oct. 13, 2006

(65) Prior Publication Data

US 2007/0100767 A1    May 3, 2007

Related U.S. Application Data

(60) Provisional application No. 60/725,664, filed on Oct. 13, 2005.

(30) Foreign Application Priority Data

Sep. 20, 2006   (KR) .................. 10-2006-0090919

(51) Int. Cl.
G06F 21/00    (2006.01)
(52) U.S. Cl. ............ 705/59; 705/51; 380/201; 380/229; 380/277; 380/278; 380/283; 726/10
(58) Field of Classification Search .............. 705/50–79; 726/4, 28, 10; 380/201, 229, 277, 278, 283
See application file for complete search history.

(56) References Cited

U.S. PATENT DOCUMENTS

| | | | | |
|---|---|---|---|---|
| 6,868,403 B1 * | 3/2005 | Wiser et al. | ...................... | 705/51 |
| 7,487,128 B2 * | 2/2009 | Spagna et al. | .................. | 705/51 |
| 2002/0013772 A1 * | 1/2002 | Peinado | ........................... | 705/51 |
| 2003/0009423 A1 * | 1/2003 | Wang et al. | ...................... | 705/51 |
| 2003/0048907 A1 * | 3/2003 | Nakahara et al. | ............. | 380/277 |
| 2003/0126086 A1 | 7/2003 | Safadi | | |
| 2003/0198347 A1 * | 10/2003 | Ribes et al. | .................... | 380/277 |
| 2004/0039916 A1 * | 2/2004 | Aldis et al. | ..................... | 713/177 |
| 2005/0044391 A1 * | 2/2005 | Noguchi et al. | .............. | 713/193 |
| 2005/0065891 A1 * | 3/2005 | Lee et al. | .......................... | 705/59 |
| 2006/0080529 A1 * | 4/2006 | Yoon et al. | ..................... | 713/168 |
| 2006/0089912 A1 * | 4/2006 | Spagna et al. | .................. | 705/51 |
| 2006/0095383 A1 * | 5/2006 | Chase et al. | .................... | 705/59 |
| 2006/0294594 A1 * | 12/2006 | Andreaux et al. | .............. | 726/26 |
| 2007/0112681 A1 * | 5/2007 | Niwano et al. | .................. | 705/59 |
| 2008/0114693 A1 * | 5/2008 | Jogand-Coulomb et al. | ... | 705/59 |
| 2008/0244706 A1 * | 10/2008 | Lenoir et al. | ...................... | 726/4 |

FOREIGN PATENT DOCUMENTS

| | | |
|---|---|---|
| JP | 2003-178164 A | 6/2003 |
| JP | 2004-303111 A | 10/2004 |
| KR | 2003-0097465 A | 12/2003 |
| KR | 10-2005-0032551 A | 4/2005 |
| WO | 03034408 A2 | 4/2003 |
| WO | 2005093544 A1 | 10/2005 |

* cited by examiner

*Primary Examiner* — Mamon Obeid
(74) *Attorney, Agent, or Firm* — Sughrue Mion, PLLC

(57) ABSTRACT

A system for providing digital rights management (DRM) license is provided. The system includes a sink system requesting a license for content, a source system generating and providing a first rights token including binding information related to the license, in accordance with the request, and a rights mediator generating a second rights token that is usable in the sink system on the basis of the first rights token and transmitting the generated second rights token to the sink system. The sink system provides the license for the content on the basis of the second rights token. The first rights token includes binding information of principals that indicates use subjects related to the license, and binding information of principals that indicates use objects related to the license.

7 Claims, 7 Drawing Sheets

METHOD AND SYSTEM FOR PROVIDING DRM LICENSE

CROSS-REFERENCE TO RELATED APPLICATIONS

This application claims priority from Korean Patent Application No. 10-2006-0090919 filed on Sep. 20, 2006 in the Korean Intellectual Property Office, and U.S. Provisional Patent Application No. 60/725,664 filed on Oct. 13, 2005 in the United States Patent and Trademark Office, the disclosures of which are incorporated herein by reference in their entirety.

BACKGROUND OF THE INVENTION

1. Field of the Invention

Methods and systems consistent with the present invention relate to a digital rights management license and, more particularly, to binding a license of digital content using information about a path through which the license is transferred.

2. Description of the Related Art

The growth of the Internet and the development of multimedia technology have led to a widespread distribution and accessibility of digital content. However, if there is no viable way to protect the rights of such digital content, the development of multimedia technology would also lead to unauthorized distribution of the digital content.

In order to more effectively protect the rights of digital content, much research on digital rights management ("DRM") is being carried out to be used in commercial services. Here, DRM denotes software or hardware technology that limits the use of digital content only to a rightful user. Thus far, most DRMs include techniques related to licenses and digital content. The license generally includes a set of rights that can be performed with respect to the digital content and content keys capable of decrypting the related content.

Ironically, the need for DRM arises from the versatile and easily manageable characteristics of digital data. It is well known that digital content, unlike analog data, can be readily copied without loss, and can be reused, processed and distributed to third parties, but a large amount of cost, effort and time are required to produce the digital content. Thus, copying and distribution of digital content without permission hinder the development of the digital content industry in that the potential profits are not being fully realized, which has deterred the business sentiment in the digital content industry.

Some efforts have been made to protect digital content. Conventionally, digital content protection has been focused on preventing access to digital content without permission. For example, only the users who have paid charges are permitted to access the digital content. However, when a user who has paid the charges accesses the digital content and distributes it to a third party, the digital content can be used by the third party without paying the charges, which leads to a number of problems in commercializing the digital content service.

A DRM has been proposed. With the implementation of DRM, users are allowed to freely access encrypted digital content, but a license is needed to decrypt and execute the encrypted digital content. As a result, the digital content can be more effectively protected by using the DRM.

FIG. 1 is a view schematically illustrating a related art DRM. As shown in FIG. 1, DRM mainly covers digital content protected by encryption or scrambling (hereinafter referred to as "encrypted content" in FIG. 1) and licenses for access to encrypted digital content.

In FIG. 1, there is a user 110 desiring to access digital content protected by DRM, a content issuer 120 providing the digital content, a license issuer 130 issuing licenses that include rights to access the digital content, and a certification authority 140 issuing certificates.

From the content issuer 120, the user 110 can obtain desired digital content that is encrypted content protected by DRM. The user 110 can obtain a license that can execute the encrypted content from the license issuer 130. The user 110 having the license can execute the encrypted content.

The certification authority 140 issues a certificate indicating that the content issuer 120 and the user 110 are rightful users. The certificate can be stored in each device when the device is manufactured. However, the certificates issued from the certification authority 140 may be revoked before they expire. As described above, DRM can protect the profits of digital content producers or issuers to render help in promoting the digital content industry.

Generally, in order to prevent a license (or digital content) from being used by an illegal device or user, it is bound to the device or user. "Binding" refers to a concept that limits the playback (or access) of digital content to a specified device or user through an encryption technique so that no device or user, except for the specified device or user, can play (or access) the content. As shown in FIG. 2, most related art DRM schemes bind a license (or digital content) to a content user, a player playing the content, a set of users using the content, a set of players, and others, using binding keys.

FIG. 2 illustrates digital content and a content issuer 210 issuing licenses for the digital content. The subject providing digital content and the subject providing licenses may differ. However, for convenience in explanation, it is considered that the same subject provides both digital content and licenses.

Referring to FIG. 2, the content issuer 210 may provide a DRM license by encrypting a content encryption key (CEK) using a binding key Ku for a set of users 220 using the content S201, encrypting the CEK using binding keys Ku_1, Ku_2, Ku_3 and Ku_4 for respective content users 222, 224, 226 and 228 using the content S202, encrypting the CEK using a binding key Kd for a set of players 230 using the content S203, or encrypting the CEK using binding keys Kd_1, Kd_2, Kd_3, Kd_4, Kd_5 and Kd_6 for respective players 231, 232, 233, 234, 235 and 236 using the content S204. As shown in FIG. 2, CEK indicates a key for encrypting the digital content.

In the above-described binding structure, the content issuer 210 cannot be sufficiently reflected, which will now be explained with reference to FIGS. 3A and 3B.

Referring to FIG. 3A, it is assumed that the first to fourth content users 222, 224, 226 and 228 possess the first player 231, third player 233, fourth player 234 and sixth player 236, respectively, and that the four content users 222, 224, 226 and 228 share the second player 232 and fifth player 235.

As shown in FIG. 3A, if the content issuer 210 intends to limit the use of content 215 through the shared second player 232 and fifth player 235 to only the first content user 222 and second content user 224, such a requirement of the content issuer cannot be satisfied under the above-described binding structure.

Specifically, as shown in FIG. 3B, in the case in which the first content user 222 and the second content user 224 are in a single domain 330, and a DRM license is provided by encrypting the CEK using a binding key Ka for this domain S310, the first content user 222 and the second content user 224 can use the content 215 through the first player 231 and the third player 233 since the first content user 222 and the second content user 224 possess the first player 231 and the third player 233, respectively. This is contradictory to the requirement of the content issuer 210.

Also, in the case in which the second player 232 and the fifth player 235 are in a single domain 340, and a DRM license is provided by encrypting the CEK using a binding key Kb for this domain S320, the third content user 226 and the fourth content user 228 can use the content 215 through the second player 232 and the fifth player 235 since the third content user 226 and the fourth content user 228 share the second player 232 and the fifth player 235, respectively. In the same manner, this result is contradictory to the requirement of the content issuer 210.

As described above, related art binding methods follow a device binding method or a user binding method that considers only the subject using the license (e.g., a content user or a set of users using the content) or the object (e.g., a player playing the content or a set of players), and thus the use range of the digital content is limited.

In addition, according to related art techniques, the DRM system issuing DRM licenses on the content issuer side and the DRM system decrypting and playing encrypted content on the player side must be the same DRM system.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Accordingly, aspects of the present invention provide use ranges of digital content in diverse forms, without binding a license only to subjects using the license or objects, in a DRM environment.

Another aspect of the present invention provides a method capable of using a DRM license even among different DRM systems.

Additional aspects, advantages, objects, and features of the present invention will be set forth in the description which follows and will become apparent to those having ordinary skill in the art upon examination of the following, or may be learned from practice of the invention.

An aspect of the present invention provides a system for providing a digital rights management (DRM) license. The system includes a sink system requesting a license for content, a source system generating and providing a first rights token including binding information related to the license, in accordance with the request, and a rights mediator generating a second rights token that is usable in the sink system on the basis of the first rights token and transmitting the generated second rights token to the sink system, in which the sink system provides the license for the content on the basis of the second rights token. And, the first rights token includes binding information of principals that indicates use subjects related to the license, and binding information of principals that indicates use objects related to the license.

In another aspect of the present invention, there is provided a method of providing digital rights management (DRM) license. The method includes (a) receiving a request for a license for content from a sink system, (b) generating a first rights token including binding information related to the license, in accordance with the request, (c) generating a second rights token that can be understood in the sink system, on the basis of the generated first rights token, and (d) providing the license for the content on the basis of the generated second rights token, in which the first rights token includes binding information of principals that indicates use subjects related to the license, and binding information of principals that indicates use objects related to the license.

BRIEF DESCRIPTION OF THE DRAWINGS

The above aspects of the present invention will become more apparent by describing in detail certain exemplary embodiments thereof with reference to the attached drawings, in which.

DETAILED DESCRIPTION OF EXEMPLARY EMBODIMENTS OF THE INVENTION

Figure 1:
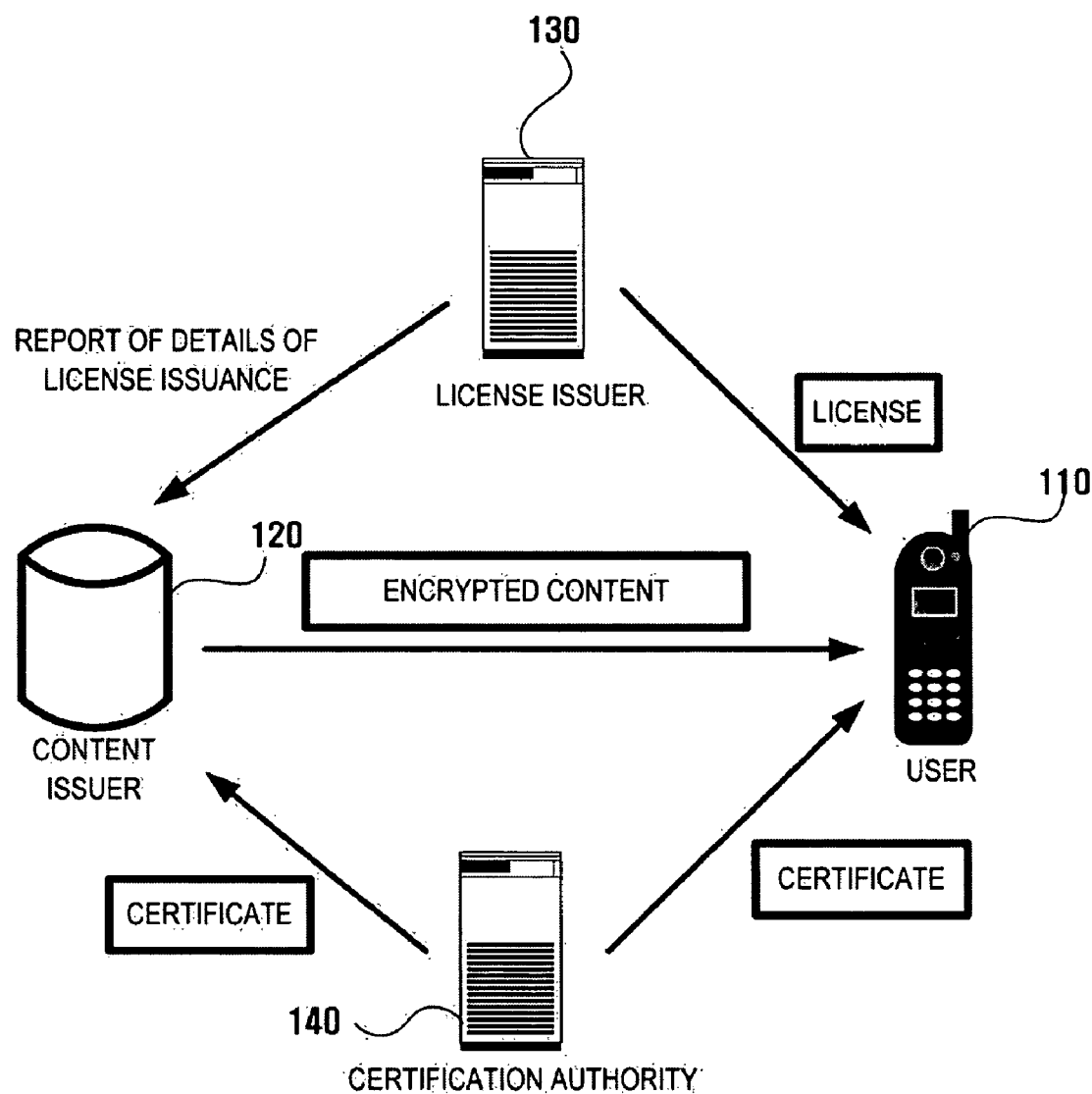
FIG. 1 is a conceptual view schematically illustrating a related art DRM.
Figure 2:
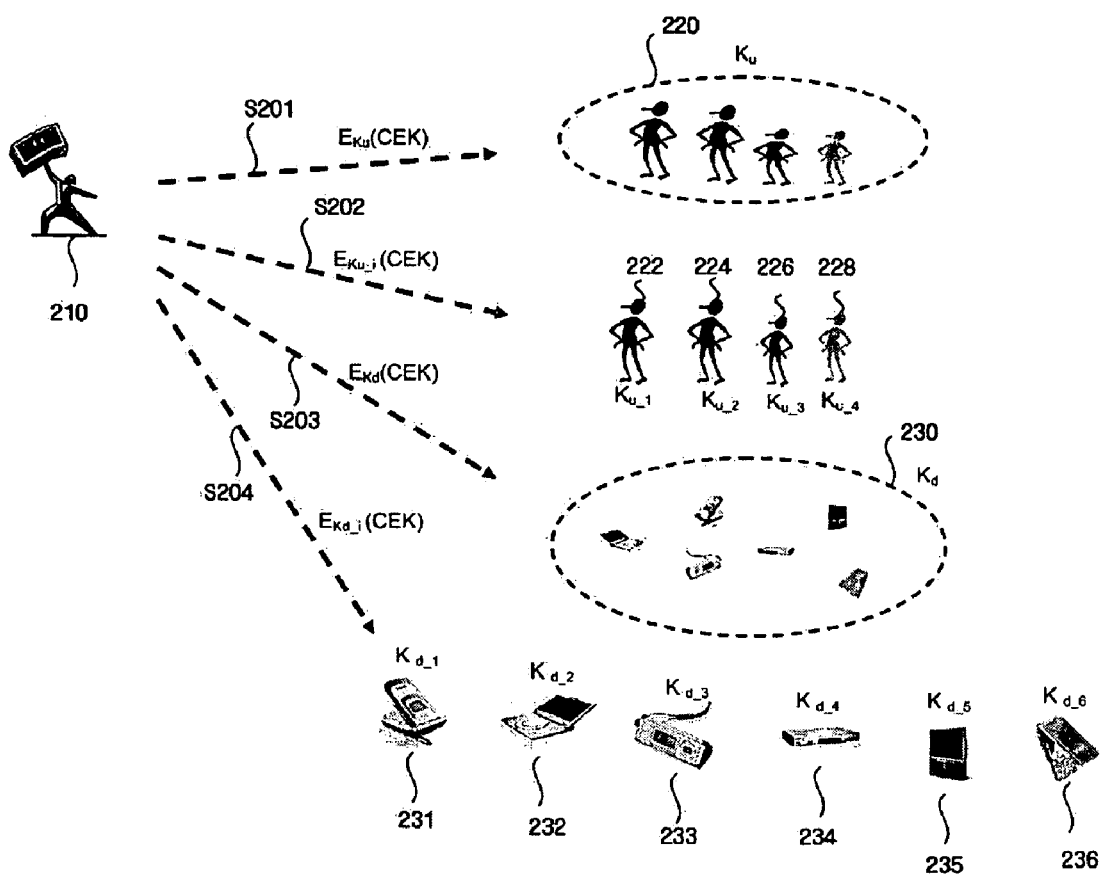
FIG. 2 is a view illustrating a related art binding method.
Figure 3A:
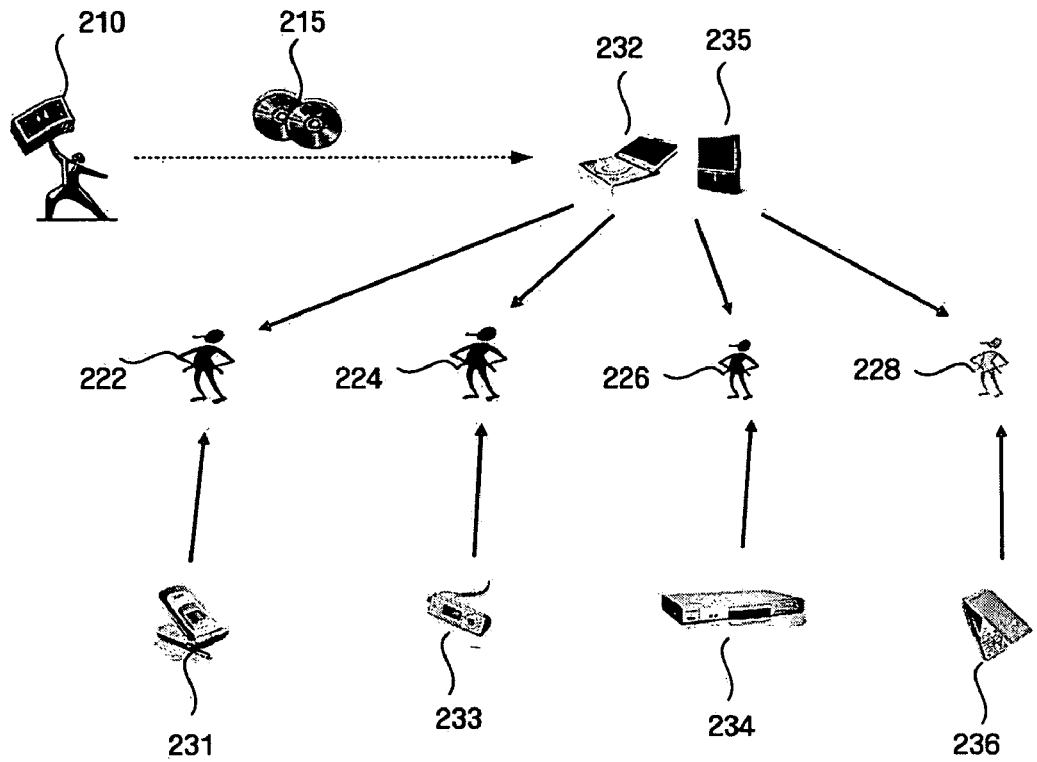
FIGS. 3A and 3B are views for explaining problems of a related art binding method.
Figure 3B:
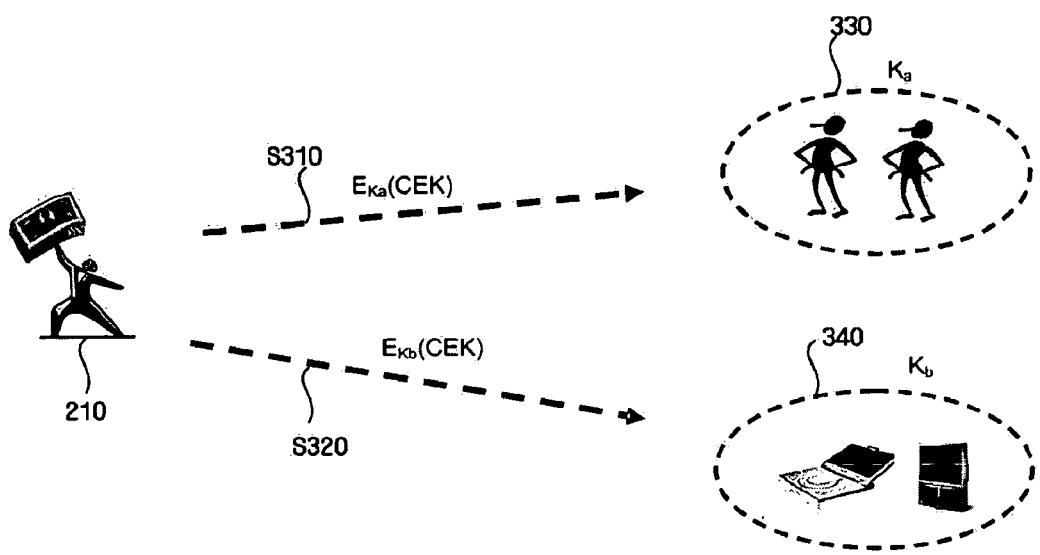

Hereinafter, exemplary embodiments of the present invention will be described in detail with reference to the accompanying drawings. The aspects of the present invention and methods for achieving the aspects will be apparent by referring to exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined by the scope of the appended claims. Throughout the description of the exemplary embodiments of the present invention, the same drawing reference numerals are used for the same elements across various figures.

The present invention will now be described with reference to the accompanying drawings illustrating block diagrams and flowcharts for explaining a method and system for providing a DRM license according to exemplary embodiments of the present invention. It will be understood that each block of the flowchart illustrations, and combinations of blocks in the flowchart illustrations, can be implemented, for instance, by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order shown. For example, two blocks shown in succession may in fact be executed substantially concurrently or the blocks may sometimes be executed in the reverse order, depending upon the functionality involved.

Figure 4:
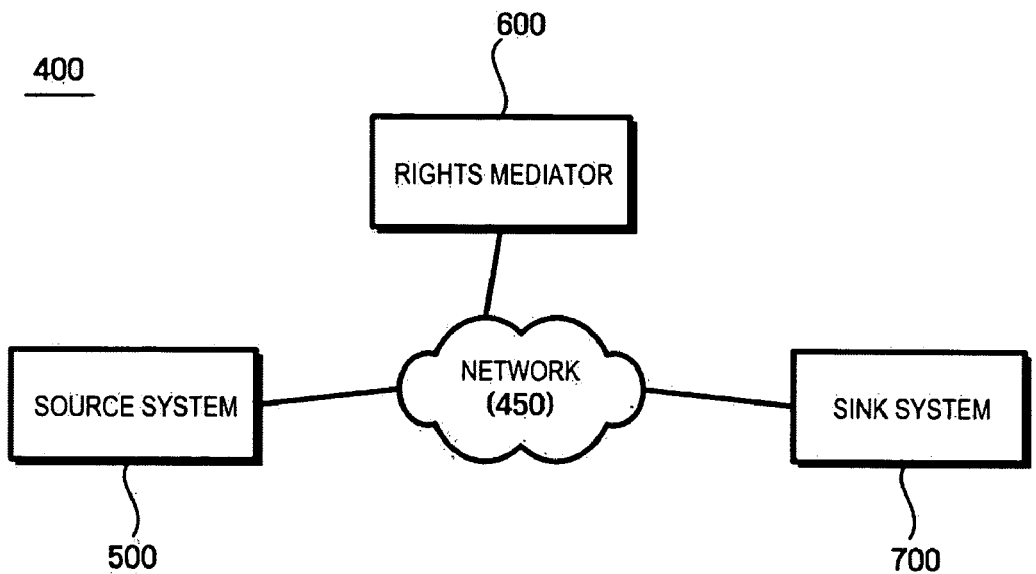
FIG. 4 is a view illustrating a system for providing a DRM license according to an exemplary aspect of the present invention.

FIG. 4 is a view illustrating a system for providing a DRM license according to an exemplary embodiment of the present invention.

Referring to FIG. 4, the system for providing a DRM license 400 includes a source system 500, a sink system 700, a rights mediator 600, and a network 450 connecting the source system, the sink system and the rights mediator.

The source system 500, which is a system that transmits content, generates a DRM license and encrypted content.

The sink system 700, which is a system that receives and uses the content from the source system 500, uses the DRM license and decrypts the encrypted content. The sink system 700 may be divided into use subjects using the sink system 700 and use objects such as players. For example, the sink system 700 may be constituted by all audio/video (AV) players belonging to a user's home network, a specified mobile device, or a user's family. Hereinafter, use subjects or use objects that constitute the sink system 700 will be called "principals."

The principals in the sink system 700 may be differently managed according to a model implementing the sink system 700. For example, information related to a specified user may be stored in a PC, a smart card and a portable phone, or may be managed in the form of an account-password.

The rights mediator 600 means a system that converts or re-processes the DRM license provided from the source system 500 into the form of a DRM license that can be understood in the sink system 700.

For example, in the case in which the source system 500 is provided with an "A" DRM system and the sink system 700 is provided with a "B" DRM system, the sink system 700 cannot understand the DRM license generated from the source system 500. Accordingly, a DRM license that can be understood by both the source system 500 and the sink system 700 is required, and according to an exemplary embodiment of the present invention, such a DRM license will be called a "rights token."

Specifically, when the source system 500 generates and provides a plurality of rights tokens related to the encrypted content, the rights mediator 600 generates a rights token using the plurality of rights tokens and provides the generated rights token to the sink system 700. In this case, in order to discriminate between types of rights tokens, a rights token provided by the source system 500 is called a "sub-rights token," and a rights token generated by the rights mediator 600 and provided to the sink system 700 is called a "main rights token."

Figure 5:
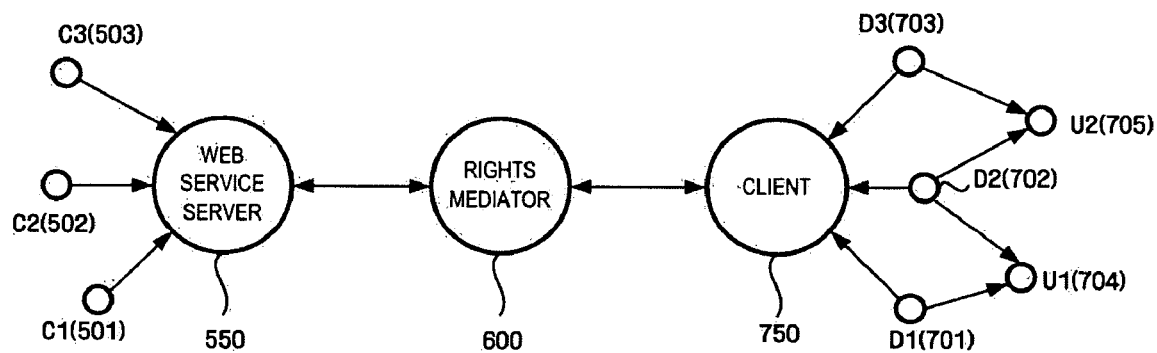
FIG. 5 is a view illustrating the detailed construction of the DRM license providing system according to an exemplary aspect of the present invention.

FIG. 5 is a view illustrating the detailed construction of the DRM license providing system according to an exemplary embodiment of the present invention.

Referring to FIG. 5, the source system 500 manages a plurality of contents 501, 502 and 503 and DRM licenses for the respective contents, and includes a web service server 550 generating the sub-rights tokens. The sink system 700 includes a plurality of principals 701, 702, 703, 704 and 705 and a client 750 receiving the main rights token through the rights mediator 600. Although the client 750 receives the encrypted content directly from the web service server 550, it may receive the content via the rights mediator 600.

As shown in FIG. 5, the respective principals constituting the sink system 700 may be constructed in the form of a topology that indicates the relations among the principals. For example, referring to FIG. 5, on the assumption that U1 704 and U2 705 are use subjects and D1 701, D2 702 and D3 703 are use objects, U1 704 can play the content through D1 701 and D2 702. Also, D1 701, D2 702 and D3 703 are constructed to belong to a domain managed by the client 750. Accordingly, the topology of the principals can be determined by edges connecting the respective principals. When a principal A that indicates use subjects by a single edge is connected to a principal B that indicates use objects, if an arrow of the edge faces the principal A, i.e., "A←B", the principal A can also play content in the principal B.

Figure 6:
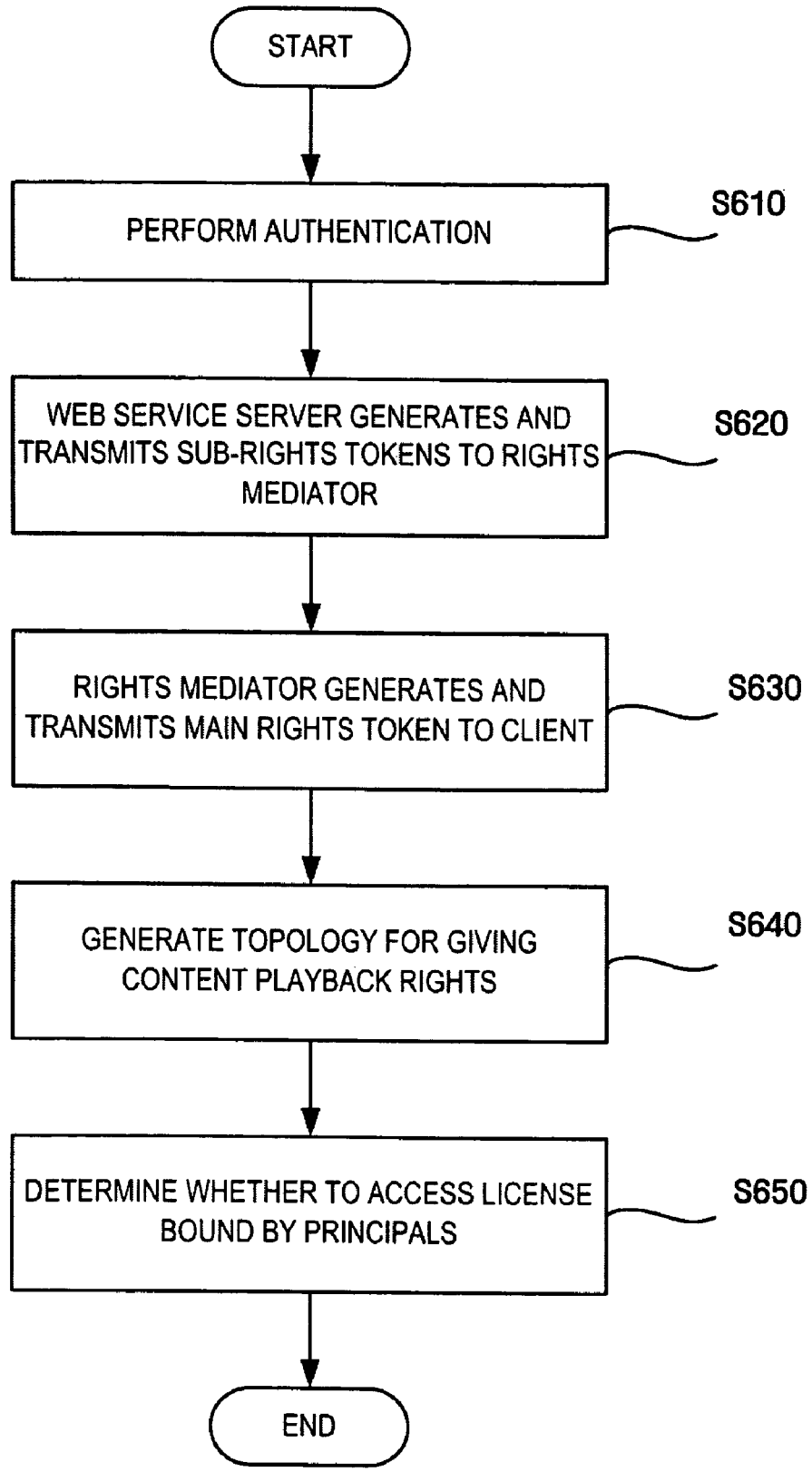
FIG. 6 is a flowchart illustrating a method of providing a DRM license according to an exemplary aspect of the present invention.

The operation of the respective constituent elements illustrated in FIG. 5 will now be explained in detail with reference to a flowchart illustrated in FIG. 6.

When the client 750 requests a license for specified content to the web service server 550, the web service server 550 performs an authentication in operation S610 to confirm whether the client 750 is a rightful client through a certificate, content purchase information of the sink system or client's access information such as an IP address, an account and a password.

If it is confirmed that the client 750 is a rightful client, the web service server 550 generates and provides a sub-rights token for the requested content to the rights mediator 600 in operation S620. The content requested by the client 750 may be encrypted by the web service server 550 to be provided to the client.

In this case, the sub-rights token includes binding information of the content requested by the client 750 and rights information of the requested content. Conventionally, such binding information is expressed as a specified principal. In the present invention, the binding information can be expressed as path information among a plurality of principals, not just by a single principal. Accordingly, the principal that indicates use subjects and the principal that indicates use objects can be expressed in a single sub-rights token. The path information is, for instance, information about edges connecting the principals.

In addition, the web service server 550 can generate and provide a plurality of sub-rights tokens. In this case, each sub-rights token includes the path information among the plurality of principals as the binding information. If the web service server 550 generates and provides the plurality of sub-rights tokens to the rights mediator 600, the rights mediator 600 generates one main rights token by combining the plurality of sub-rights tokens, and then transmits the generated main rights token to the client 750 in operation S630. In this case, the main rights token includes relation information indicating relations among binding information or rights information included in the respective sub-rights tokens, and through this relation information, operations among the respective binding information or rights information, such as difference set, set intersection and union, become possible. For example, if the relation information between the first binding information included in the first sub-rights token and the second binding information included in the second sub-rights token indicates the set intersection, it can be understood that content playback rights are given to the principals belonging to a common path of the path information corresponding to the first binding information and the path information corresponding to the second binding information.

The relation information may be generated by the web service server 550 and then provided to the rights mediator 600.

The client 750 can generate a topology for giving the content playback rights on the basis of the main rights token received from the rights mediator 600 in operation S640.

That is, since the main rights token includes the path information about a plurality of paths and the relation information among the respective path information, one topology, such as a tree structure, can be generated on the basis of the path information and the relation information.

The client 750 can determine whether to access the license bound by principals that constitute the sink system 700 through the topology generated as above in operation S650.

Figure 7:
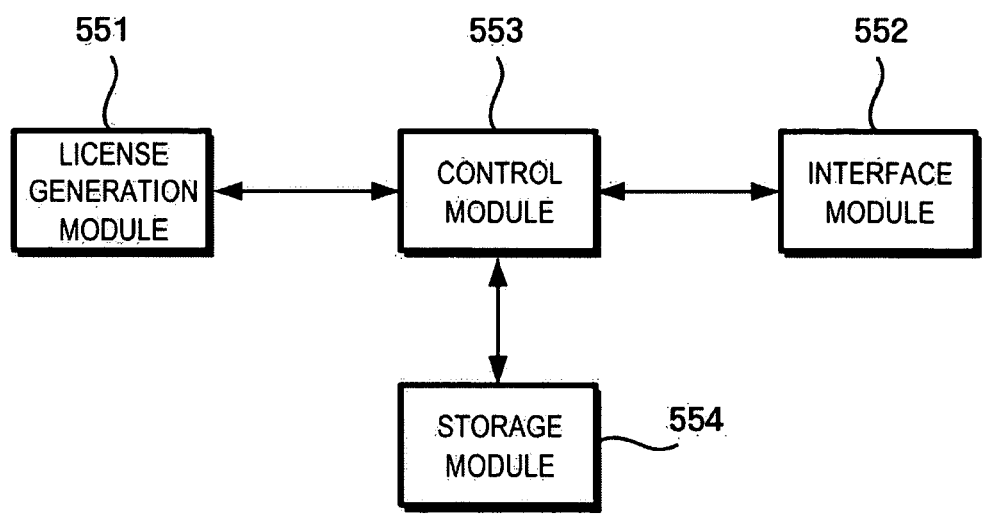
FIG. 7 is a view illustrating the construction of a web service server according to an exemplary aspect of the present invention.

FIG. 7 is a view illustrating the construction of a web service server according to an exemplary embodiment of the present invention.

Referring to FIG. 7, the web service server 550 according to an exemplary embodiment of the present invention includes an interface module 552 communicating with the client 750 or the rights mediator 600, a license generation module 551 generating the sub-rights tokens for the content requested by the client 750, a storage module 554 storing the content requested by the client 750 or the binding information for the requested content, and a control module 553 controlling the operation of the respective modules.

The modules used in the exemplary embodiments of the present invention include software or hardware elements, such as a field-programmable gate array (FPGA) or an application-specific integrated circuit (ASIC), to perform a specific function. Modules, however, are not limited to software or hardware. Modules may be configured in an addressable storage medium, or configured to reproduce one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

When the interface module 552 receives the request for the content and the license request for the content from the client 750, the control module 553 searches the storage module 554, encrypts the requested content, and transmits the encrypted content to the client 750 through the interface module 552.

In addition, the control module 553 provides the binding information stored in the storage module 554 to the license generation module 551, and the license generation module 551 generates the sub-rights tokens by using the binding information and provides the generated sub-rights tokens to the control module 553. In this case, the binding information may be expressed as the path information that indicates the relations among the plurality of principals. The control module 553 transmits the generated sub-rights tokens to the rights mediator 600 through the interface module 552.

Figure 8:
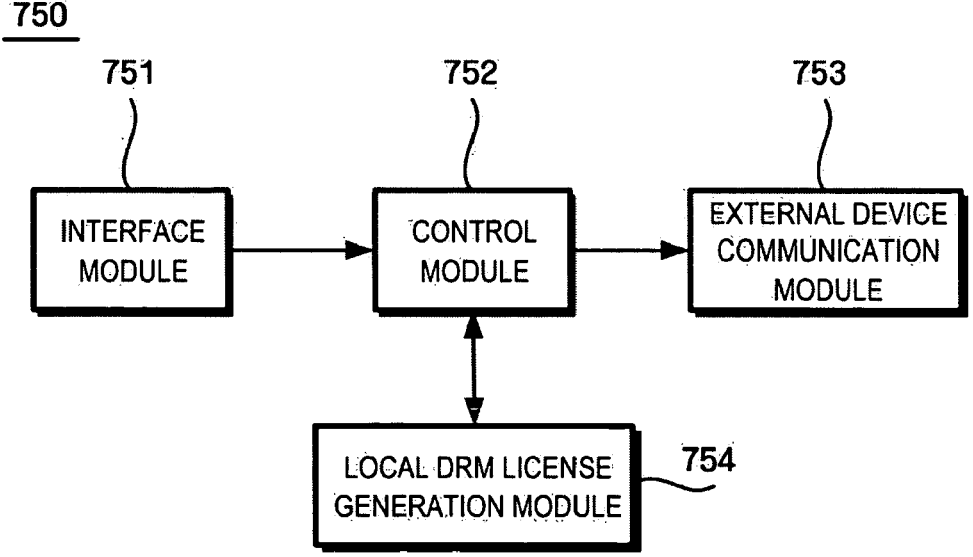
FIG. 8 is a view illustrating the construction of a client according to an exemplary aspect of the present invention.

FIG. 8 is a view illustrating the construction of a client according to an exemplary embodiment of the present invention.

Referring to FIG. 8, the client 750 according to an exemplary embodiment of the present invention includes an interface module 751 communicating with the web service server 550 or the rights mediator 600, a local DRM license generation module 754 converting the main rights token received from the rights mediator 600 into the form of a DRM license installed in the client 750, an external device communication module 753 providing the main rights token to use subjects or use objects that constitute the sink system, and a control module 752 controlling the operation of the respective modules.

When the interface module 751 receives the main rights token from the rights mediator 600, the control module 752 generates a topology for giving the content playback rights on the basis of the main rights token. Then, the control module 752 determines whether to access the license bound by principals that constitute the sink system by using the generated topology, and on the basis of this, controls the local DRM license generation module 754 to generate the license that can be understood by the DRM license system installed in the client 750.

In addition, the control module 752 may provide the main rights token received from the rights mediator 600 through the external device communication module 753 to the use subject or the use object, or convert the main rights token into a license form suitable for the use subject or the use object.

Figure 9A:
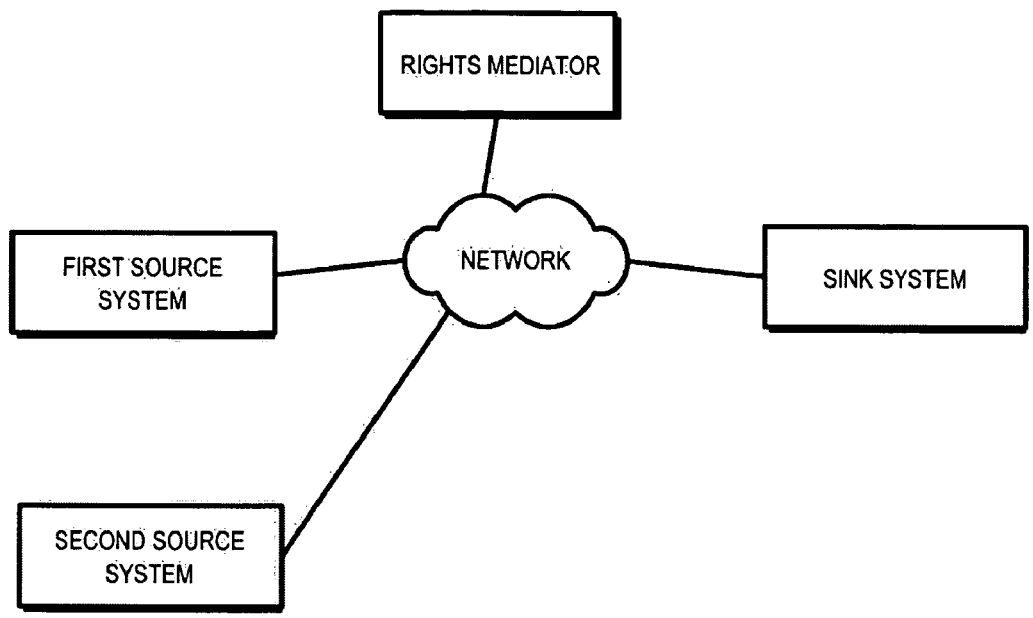
FIGS. 9a and 9b are views illustrating systems for providing a DRM license according to an exemplary aspect of the present invention.
Figure 9B:
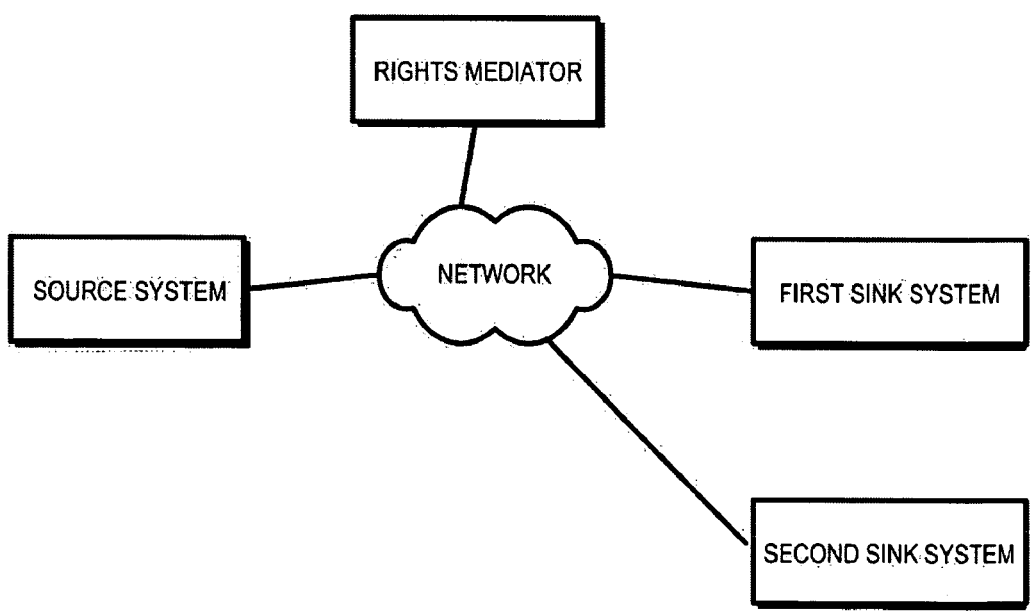

Although FIG. 4 illustrates the DRM license providing system including one source system 500 and one sink system 700, the present invention is not limited thereto, and the DRM license providing system may include a plurality of source systems and a plurality of sink systems as illustrated in FIGS. 9*a* and 9*b*.

If a plurality of source systems exist, the rights mediator can generate one main rights token by combining the sub-rights tokens received from the respective source systems, and in this case, the generated main rights token includes information indicating relations among the source systems.

As described above, according to exemplary embodiments of the present invention, the use range of the digital content can be provided in diverse forms, and the DRM license can be used among different DRM systems.

In addition, the present invention can satisfy the requirement of the content issuer desiring the use of the digital content in diverse forms.

The exemplary embodiments of the present invention have been described with reference to the accompanying drawings. However, those skilled in the art will appreciate that many variations and modifications can be made to the disclosed exemplary embodiments without substantially departing from the principals of the present invention. Therefore, the disclosed exemplary embodiments of the invention are used in a generic and descriptive sense only and not for purposes of limitation.

What is claimed is:

1. A system for providing a digital rights management (DRM) license, the system comprising:
a sink system programmed to request a license for content;

a plurality of different source systems each programmed to generate a sub-rights token that includes binding information related to the license, in accordance with the request from the sink system; and a rights mediator programmed to generate a main rights token, and to transmit the main rights token to the sink system;

wherein the sub-rights token generated by each of the plurality of different source systems comprise binding information of principals that indicate use subjects related to the license, and binding information of principals that indicate use objects related to the license;

wherein the rights mediator is further programmed to generates the main rights token by combining the sub-rights tokens received from the different source systems, and wherein the main rights token comprises relation information indicating relations between each of the binding information included in each of the sub-rights tokens wherein the binding information comprises path information that indicates relations among a plurality of principals to which the license is provided;

wherein the sink system is further programmed to:

determine a path common to the path information of each of the sub-rights tokens;

generate a topology based on the determined common path;

generate the license based at least on the generated topology; and provide the license to principals constituting the sink system based on the generated topology.

2. The system of claim 1, wherein the source system comprises a web service server which manages a plurality of contents and DRM licenses for the respective contents and which generates the sub-rights token.

3. The system of claim 1, wherein the sink system comprises a client which is connected to the plurality of principals and which receives the main rights token from the rights mediator.

4. A method of providing digital rights management (DRM) license, the method comprising:

receiving, by a source system, a request for a license for content from a sink system;

generating, by each of a plurality of different source systems, a sub-rights token comprising binding information related to the license, in accordance with the request;

receiving, by a rights mediator, the sub-rights tokens from the different source systems, generating, by the rights mediator, a main rights token based on the sub-rights tokens, and transmitting, by the rights mediator, the main rights token to the sink system;

wherein the sub-rights tokens from the different source systems comprise binding information of principals that indicate use subjects related to the license and comprise binding information of principals that indicate use objects related to the license;

wherein the rights mediator generates the main rights token by combining the sub-rights tokens received from the different source systems, wherein the main rights token comprises relation information indicating relations between each of the binding information included in each of the sub-rights tokens and wherein the binding information comprises path information that indicates relations among a plurality of principals to which the license is provided;

determining a path common to the path information of each of the sub-rights tokens;

generating, by the sink system, a topology based on the determined common path;

generating, by the sink system, the license based at least on the generated topology; and providing, by the sink system, the license to principals constituting the sink system based on the generated topology.

5. The system according to claim 1, wherein the use subjects are users of the sink system, and the use objects are playing devices of the sink system.

6. The system according to claim 1, wherein the sub-rights token is interpretable by the source system and the sink system.

7. The system according to claim 1, wherein the topology comprises path information of a plurality of paths and relation information among the path information for the content playback rights based on the main rights token.

* * * * *